United States Patent
Matsukawa et al.

[11] Patent Number: 5,867,744
[45] Date of Patent: *Feb. 2, 1999

[54] CAMERA HAVING STORAGE AREA FOR POWER SOURCE INCLUDING FIRST AND SECOND STAGES

[75] Inventors: Nobuo Matsukawa; Hiroshi Masuda, both of Tokyo, Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 661,699

[22] Filed: Jun. 11, 1996

Related U.S. Application Data

[63] Continuation-in-part of Ser. No. 365,871, Dec. 29, 1994, abandoned.

[30] Foreign Application Priority Data

Dec. 30, 1993 [JP] Japan .................................. 5-354434
Jun. 15, 1995 [JP] Japan .................................. 7-174234

[51] Int. Cl.$^6$ .......................... G03B 17/18; G03B 17/00; G03B 17/02
[52] U.S. Cl. ..................... 396/287; 396/299; 396/535; 396/539
[58] Field of Search .................. 354/288, 289.1, 354/289.12, 474, 475, 484; 396/539, 281, 287, 288, 289, 290, 291, 292, 297, 299, 439, 535

[56] References Cited

U.S. PATENT DOCUMENTS

| | | | |
|---|---|---|---|
| 4,643,549 | 2/1987 | Nagata et al. | 354/64 |
| 4,666,278 | 5/1987 | Uematsu et al. | 354/288 |
| 4,697,909 | 10/1987 | Machida et al. | 354/484 |
| 4,712,898 | 12/1987 | Haraguchi | 354/288 |
| 5,006,881 | 4/1991 | Kodama | 354/484 |
| 5,227,822 | 7/1993 | Takahashi et al. | 354/82 |

Primary Examiner—Eddie C. Lee

[57] ABSTRACT

An electric camera has a camera body, a display portion for displaying information preset to the camera body, a tripod mounting screw portion provided in a bottom portion of the camera body and a cell containing portion having at least first and second stages, the first stage having a first plurality of cells so as to interpose the tripod mounting screw portion between the first plurality of cells, and the second stage having a second plurality of cells without interposing the tripod mounting screw portion between the second plurality of cells, wherein the second stage is disposed on top of the first stage, at least one side portion of the first stage is extended outwardly beyond one side portion of the second stage to be a projected portion, and the display portion is disposed immediately above the projected portion and adjacent to the one side portion of the second stage.

14 Claims, 7 Drawing Sheets

CAMERA HAVING STORAGE AREA FOR POWER SOURCE INCLUDING FIRST AND SECOND STAGES

This is a continuation-in-part application of U.S. patent application Ser. No. 08/365,871 filed on Dec. 29, 1994 now abandoned.

BACKGROUND OF THE INVENTION

1. Field of the Invention

The present invention relates to an electric camera on the bottom of which a tripod mounting screw is formed to mount a tripod.

2. Related Background Art

Conventionally, in cameras, the setting of conditions such as the shutter speed, the f-number, etc. is widely carried out by digital signals from selection buttons and an electronic dial and those contents and changes of conditions are displayed on an LCD panel or the like.

Referring to FIG. 1, an electronic dial 2 and an LCD panel 3 are provided on an upper surface 1a of a camera 1 and selection buttons 4, 5, 6 and 7 are provided on an upper surface 1b of the camera 1. The electronic dial 2 generates pulses in accordance with its rotation. When the electronic dial 2 is operated alone, the setting of a shutter speed is carried out. On the other hand, when it is operated together with one of the selection buttons 4 to 7, in accordance with the kind of selection button, e.g., the setting of an exposure correction is carried out. Those setting contents or the results of changes of conditions of the camera in accordance with the setting contents are displayed on the LCD panel 3.

On the other hand, in many cameras, as shown in FIGS. 2 and 3, a tripod mounting screw 101 is formed in the bottom portion of a camera body 102 so as to mount a tripod. Also, in recent electric cameras, it is necessary to house cells in the camera body 102, but from the relationship between space and weight, cells 103c and 103d are contained in a bottom portion 102a of the camera body 102 so as to interpose a tripod mounting screw 101 between them.

Owing to the development of various techniques such as an AF technique, etc., functions of cameras have been increasing in number recently. As a result, operating members and display contents need to be increased in number. Particularly, it is necessary to make the display portion large to secure observability of the display contents while increasing the number of display contents. However, the sizes of cameras are limited due to miniaturization, so that it is difficult to comply with the achievement of the observability of the display contents and the increase of the numbers of operating members and display contents.

Also, when operating a lens 104, a projected portion 102b of the front surface of the camera body 102 (left side in FIG. 3) interferes with the hands of an end-user, which decreases operability.

Also, since the bar-like cells 103a to 103h and the tripod mounting screw 101 are contained in the bottom portion of the same camera body 102, an efficiency in space utilization of the bottom portion of the camera body is poor so that there is room for improvement in miniaturization of the cameras.

SUMMARY OF THE INVENTION

It is an object of the present invention to provide an electric camera in which a space for display is newly secured, its miniaturization is achieved and the observability of the display is secured while the number of operating members and display contents are increased.

In order to achieve the above object, an electric camera of the present invention has a tripod mounting screw provided in the bottom surface of a camera body, a plurality of cells contained in a plurality of stages disposed one over another in a lower portion of the camera body, and a display portion for displaying information sent to the camera body, wherein the cells in the lowest stage are disposed so as to interpose the tripod mounting screw between them, the cells in the other stages are disposed so as to be adjacent to each other without interposing the tripod mounting screw between them, and the display portion is disposed next to a side portion of the stages other than the lowest stage and over a projected portion of the lowest stage formed as the cells in the lowest stage are disposed so as to interpose the tripod mounting screw.

In the above-structured electric camera, a space is secured in the side portion of the stages other than the lowest stage and the display portion is disposed in the space. Therefore, while the new space is secured, miniaturization of the camera can be achieved. Also, while increasing the number of operating members and display contents, observability of the display contents can be secured.

It is another object of the present invention to contain cells, electric circuits, and a tripod mounting screw with efficiency so as to miniaturize the camera.

In order to achieve the above object, an electric camera of the present invention has a tripod mounting screw 56 provided in the bottom portion of a camera body, a plurality of bar-like cells 52a to 52d contained in a plurality of stages disposed in a lower portion of the camera body, and wiring boards 63 and 64 having electric components mounted thereon for receiving an electric power from the bar-like cells, wherein at least the plurality of bar-like cells in the lowest stage are disposed so as to interpose the tripod mounting screw between them, the plurality of bar-like cells in the upper stages than the lowest stage are disposed so as to be adjacent to each other without interposing the tripod mounting screw between them, spaces are formed above a projected portion formed to allow the bar-like cells in the lowest stage to interpose the tripod mounting screw between them and in the side portions of the bar-like cells disposed so as to be adjacent to each other without interposing the tripod mounting screw between them, and the wiring boards are disposed in these spaces.

In the above-structured electric camera, the plurality of bar-like cells in the lowest stage are disposed so as to interpose the tripod mounting screw between them, the plurality of bar-like cells in the upper stages than the lowest stage are disposed so as to be adjacent to each other without interposing the tripod mounting screw between them, spaces are formed above a projected portion formed to allow the bar-like cells in the lowest stage to interpose the tripod mounting screw and in the side portions of the bar-like cells disposed so as to be adjacent to each other without interposing the tripod mounting screw between them, and the wiring boards are disposed in these spaces. Therefore, the cells, the electric circuits, and the tripod mounting screw can be contained with efficiency so as to miniaturize the camera.

BRIEF DESCRIPTION OF THE DRAWINGS

The above object and advantages will become apparent from the detailed description of the invention with reference to the accompanying drawings, wherein.

DESCRIPTION OF THE PREFERRED EMBODIMENTS

Figure 1:
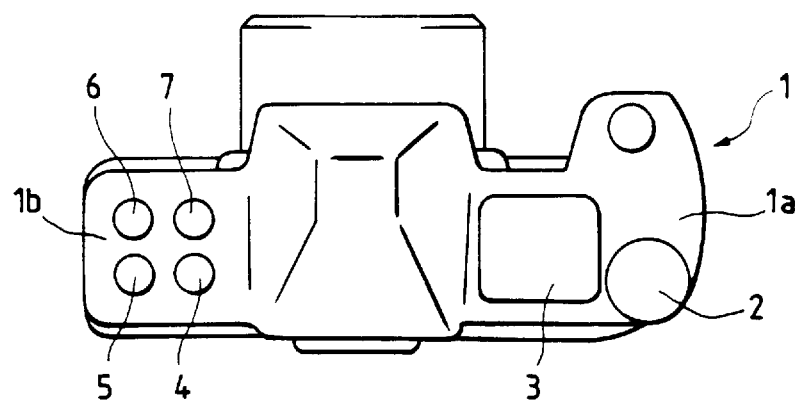
FIG. 1 is a top plan view of an electric camera according to an embodiment of the present invention the same as that of a conventional electric camera.
Figure 2:
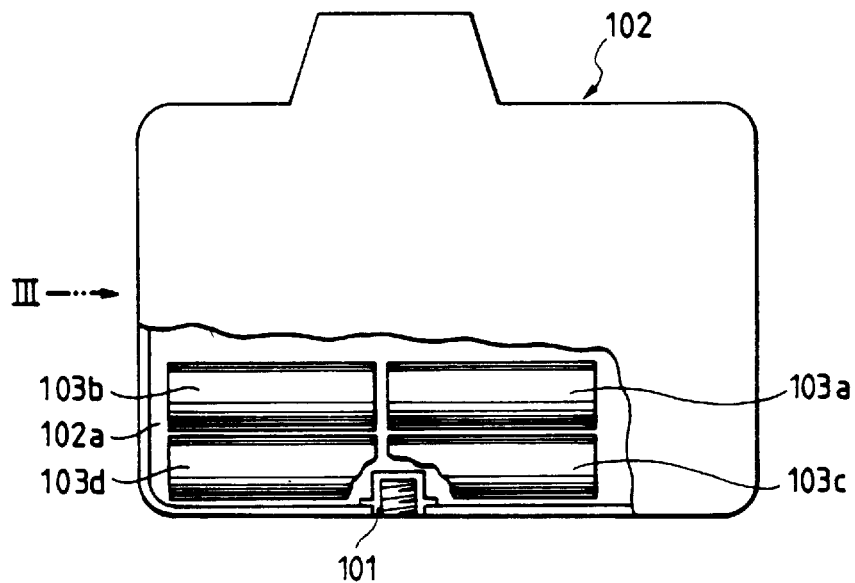
FIG. 2 is a rear view of the conventional electric camera.
Figure 4:
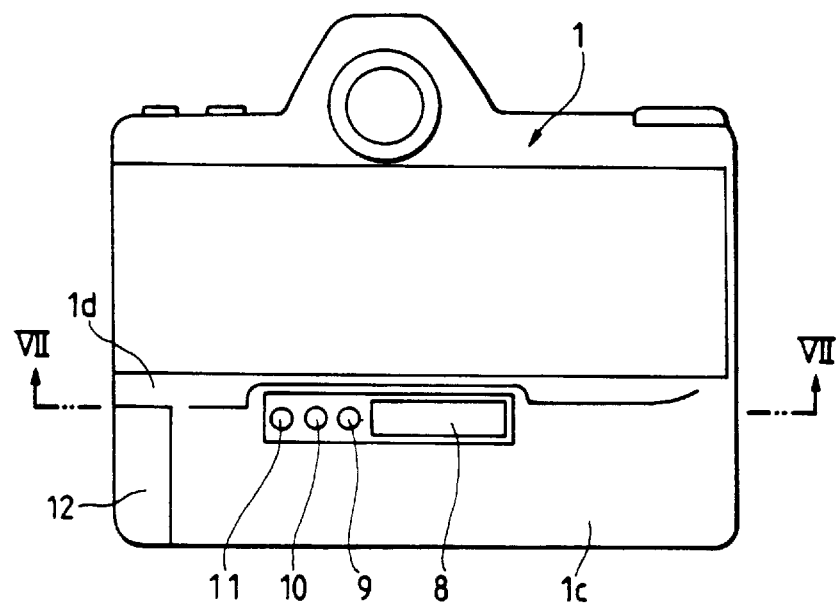
FIG. 4 is a rear view of the electric camera according to the embodiment of the present invention.

FIG. 1 is a top plan view of an electric camera according to an embodiment of the present invention. FIG. 4 is a rear view of the electric camera.

As shown in FIG. 1, an electronic dial 2 and a first display panel 3 are provided on the right side of an upper surface 1a of a camera 1 and selection buttons 4, 5, 6 and 7 are provided on a left-hand upper surface 1b. The electronic dial 2 generates pulses in accordance with its rotation and is well-known means for inputting setting information to the camera by operating it alone or operating it together with the selection buttons 4 to 7. When operated alone, the setting of a shutter speed is carried out. On the other hand, when operated together with, e.g., the selection button 4, the setting of an exposure correction is carried out. The setting contents or the results of changes of conditions of the camera in accordance with the setting contents are displayed on the first display panel 3. The indications on the first display panel 3 are performed by an LCD device or the like.

In FIG. 4, a second display panel 8 and selection buttons 9, 10 and 11 are provided on a lower portion of a rear surface 1c of the camera 1. These are utilized together with the electronic dial 2 for setting information. For example, when the selection button 9 for film speed setting and the electronic dial 2 are operated together, a film speed is set. Those setting contents or the results of changes of conditions of the camera in accordance with the setting contents are displayed on the second display panel 8. The indications of the second display panel 8 are performed by an LCD device or the like. The display panel 8 displays information preset to the camera body. Furthermore, buttons 9–11 and display panel 8 are formed immediately above the projected portion.

Figure 5:
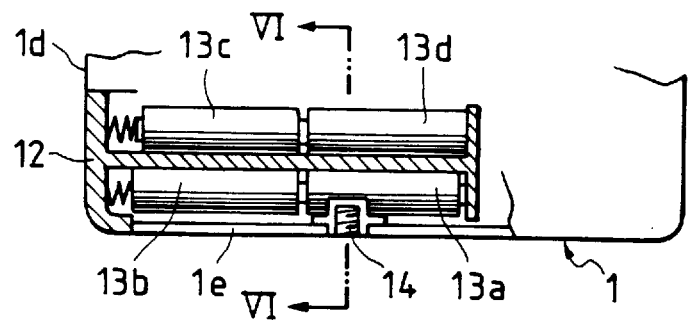
FIG. 5 is a partially cross-sectional rear view of the electric camera according to the embodiment of the present invention.

As shown in FIG. 5, cells 13a to 13d are contained in the lower portion of the camera 1. The cells 13a to 13d are loaded or unloaded from a left end 1d of the lower portion. FIG. 4 shows the state in which a cell case 12 is inserted in the camera 1. When the cell case 12 is drawn out of the camera 1 to the left in the drawing, both are separated from each other. Eight AA cells are contained in the cell case 12. In FIG. 5, only the four cells on one side are shown. A tripod mounting screw 14 is fixed to a bottom surface 1e of the camera 1. In order to load or unload the cell case 12 rightward or leftward respectively in FIG. 4, a space is provided between the cells 13a, 13b and cells 13e, 13f (not shown) in the lower rows. Then, the tripod mounting screw 14 can be provided in the space.

Figure 6:
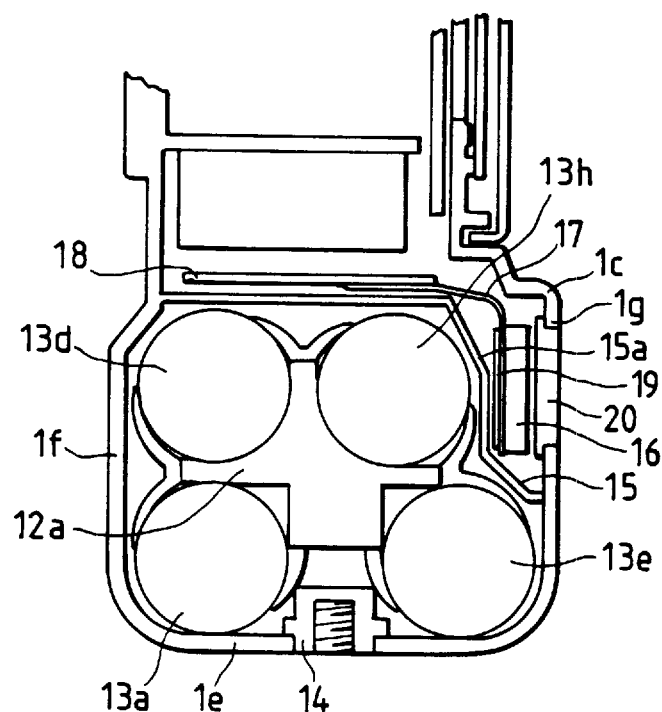
FIG. 6 is a cross-sectional side view of the electric camera according to the embodiment of the present invention.

FIG. 6 is a vertical cross-sectional view taken along a line VI—VI in FIG. 5. A cell containing section is formed in the lower portion of the camera 1 by the rear surface 1c, the bottom surface 1e, a front surface 1f and a partition wall 15. Also, a space is formed between a right-hand portion 15a of the partition wall 15 and the rear surface 1c so as to provide the second display panel 8 and the selection buttons 9, 10 and 11 therein.

Referring to FIG. 6, in the cell containing portion, the cells 13a, 13d, 13e and 13h (and the cells 13b, 13c, 13f and 13g (not shown)) are held by a holder 12a of the cell case 12 (see FIG. 5). Since the tripod mounting screw 14 is provided in the bottom surface 1e, the cells 13a and 13e in the lower rows, the first stage are disposed apart from each other so as to avoid the tripod mounting screw 14. On the other hand, the cells 13d and 13h in the upper rows which form a second stage above the first stage are disposed apart only for the thickness of the holder 12a. Therefore, the cell 13e (and the cell 13f (not shown)) in the lower row is projected rearward forming a projected portion (rightward in the drawing) as compared with the cell 13h (and the cell 13g (not shown)) in the upper row. Thereby, the space between the right-hand portion 15a of the partition wall 15 and the rear surface 1c of the camera 1 is formed. FIG. 6 illustrates the display portion 16 being formed between a plane defining the upper surface of the second stage containing cells 13c, 13d, 13h, and 13g and a plane defining the upper surface of the first stage containing cells 13a, 13b, 13e, and 13f.

Figure 3:
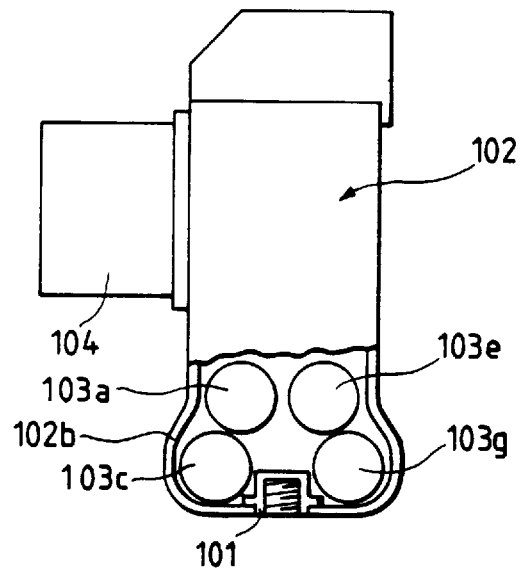
FIG. 3 is a partially cross-sectional side view of the conventional electric camera observed from a direction as indicated by an arrow III of FIG. 2.

Also, although the cells 13a and 13d on the front side (left side in FIG. 6) of the camera 1 are located in upper and lower positions, the cells 13e and 13h on the rear side of the camera (right side in FIG. 6) are located in oblique positions from each other. In the conventional arrangement of the cells (see FIG. 3), the cells 103c and 103g are projected uniformly forward and rearward with the tripod mounting screw 101 interposed between them, but only the cell 13e (and the cell 13f (not shown)) is projected rearward in this embodiment. Then, it is possible to solve the problem that the projected portion on the front surface of the conventional camera causes the lowering of the operability of the lens.

In the space formed between the right-hand portion 15a of the partition wall 15 and the rear surface 1c of the camera 1 is contained an LCD 16 of the second display panel 8 and operating members 9 to 11 to be described later. The LCD 16 is connected to a control circuit plate i.e., wiring board, 18 via an FPC 17 and fixed to the rear surface 1c by means of a plate 19. The wiring board 18 is disposed so that the side provided with an electric component faces the tripod mounting screw portion 14. A window portion 1g is provided in the rear surface 1c and a window member 20 formed of acrylic resin is fitted in the window portion 1g.

Figure 7:
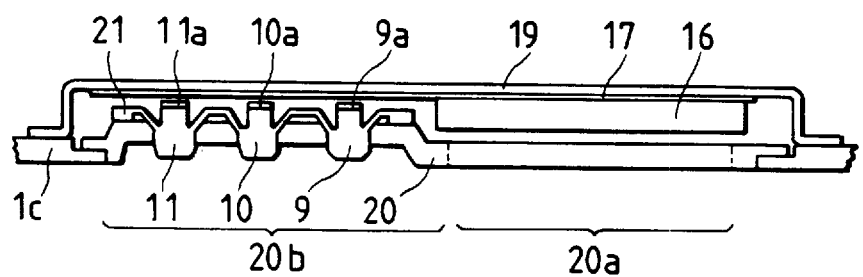
FIG. 7 is a horizontal cross-sectional view of the electric camera according to the embodiment of the present invention.

FIG. 7 is a horizontal cross-sectional view taken along a line VII—VII in FIG. 4. The window member 20 has a display section 20a in opposition to the LCD 16 and an operating section 20b. Only the display section 20a is transparent and the other portion of the window member 20 is opaque. The operating section 20b is provided with holes for exposing the selection buttons 9, 10 and 11 to the outside. The selection buttons 9, 10 and 11 are integral parts of a rubber 21. Conductive rubbers 9a, 10a and 11a are attached to the respective selection buttons 9, 10 and 11. When the conductive rubbers 9a to 11a are brought into contact with a conductive pattern (not shown) of the FPC 17 in opposition to them, switching operations become possible. The plate 19 is extended behind the selection buttons 9 to 11 to receive the pressing force of the selection buttons 9 to 11. The operating section 20b of the window member 20 is recessed slightly below the display section 20a and the upper surfaces of the selection buttons 9 to 11 are slightly lower than the display section 20a.

According to the above-described embodiment, among the cells disposed in upper and lower cell containing portions, the cells in the lower cell containing portion are projected rearward to avoid the tripod mounting screw provided in the bottom surface of the camera and the space is provided between the rear surface of the camera and the upper and lower cell containing portions with the cells contained. And, the LCD panel and the operating members related to it are provided in the space. Therefore, without enlarging the size of the upper surface of the camera, the number of display contents can be increased in accordance with the increase in the number of functions. As a result, it is possible to achieve miniaturization of cameras in which the number of operating members and display contents are increased.

Also, since the display panel on the rear surface of the camera and the rear surface of the camera are located approximately in the same plane, the acrylic window will not project to the outside as compared with a separately provided display panel on a camera. Therefore, it has an advantage to withstand impact from the outside and will not be a hindrance when taking photographs. Further, the operating portion adjacent to the display portion is slightly recessed with respect to the display portion. Therefore, the selection buttons will not project from the rear surface, so that inadvertent operational errors can be avoided.

Further, although the length of the display portion is limited as the display portion is provided by the use of the positional difference between the upper and lower cell containing portions, the total length of two cells in the longitudinal direction can be made use of for the breadth of the display portion, so that a sufficient area can be obtained for the display portion.

Furthermore, the cell containing portion is formed integrally with the camera body in the electric camera in the above embodiment, but the present invention is applicable to a camera to a lower portion of which a separate cell container is attached.

According to the present invention as above, a space is secured on a side portion of a plurality of long cylindrical cells disposed adjacent to each other without interposing a tripod mounting screw between them and a display portion is disposed in the space. Therefore, while the space is newly secured, the miniaturization of a camera can be achieved. Also, while increasing the number of operating members and display contents, observability of the display contents can be secured.

Figure 8:
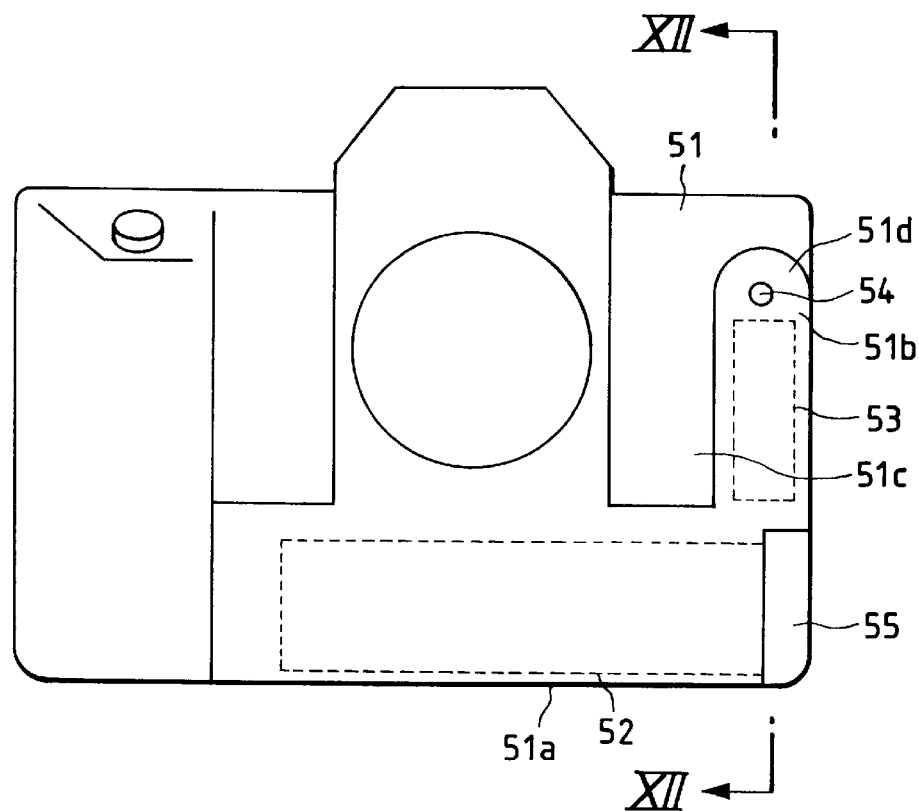
FIG. 8 is a front view of an electric camera according to a second embodiment of the present invention.

FIG. 8 is a front view for showing an electric camera according to a second embodiment of the present invention.

In FIG. 8, a power source 52 is contained in a bottom portion 51a of a body 51 of the camera. The power source 52 is comprised of cylindrical cells 52a, 52b, 52c and 52d (see FIG. 10). An end portion 51b of the body 51 is in a form projected from the front surface 51c and contains a motor 53 for driving the camera mechanism. A light-emitting display portion 54 for self timer display is contained in an upper portion 51d of the body 51.

Figure 9:
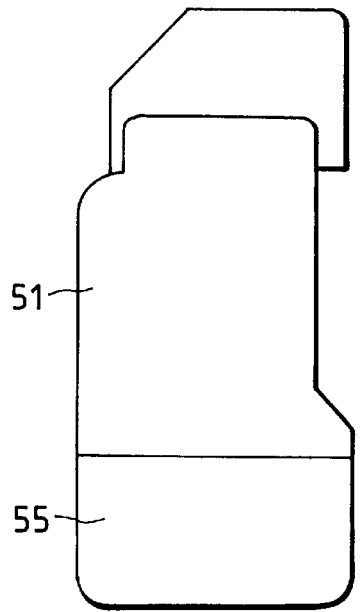
FIG. 9 is a side view of the electric camera according to the second embodiment of the present invention.
Figure 10:
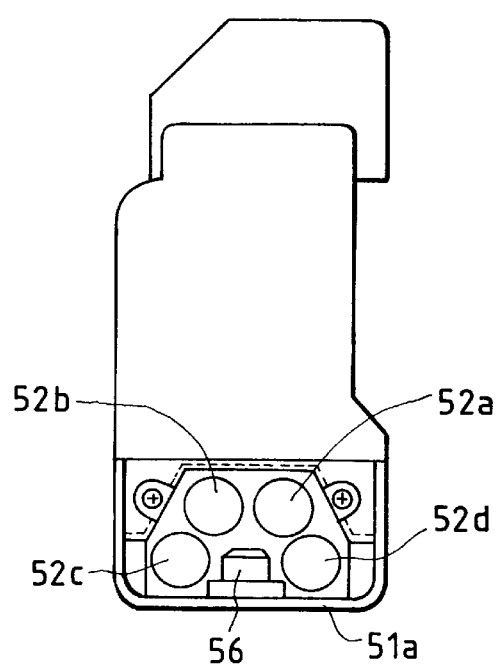
FIG. 10 is a side view of the electric camera according to the second embodiment of the present invention, for showing a state in which the camera is deprived of the exterior member.

FIG. 9 is a side view for showing the electric camera according to the second embodiment of the present invention. An exterior member 55 is a part of the side surface of the power source 52. FIG. 10 shows a state in which the camera of FIG. 9 is deprived of the exterior member 55. A tripod mounting screw 56 is fixed in the bottom portion 51a. Out of the cylindrical cells for constituting the power source 52, the cylindrical cells 52c and 52d are disposed so as to interpose the tripod mounting screw 56 between them, and the cylindrical cells 52a and 52b are disposed to be adjacent to each other without interposing the tripod mounting screw 56 between them.

Figure 11A:
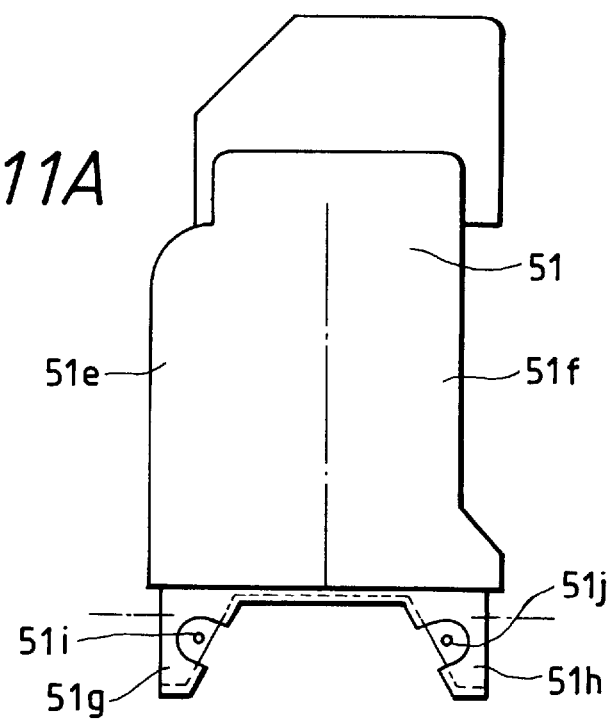
FIGS. 11A to 11C are developed views of the bottom portion of the body of the electric camera according to the second embodiment of the present invention.
Figure 11B:
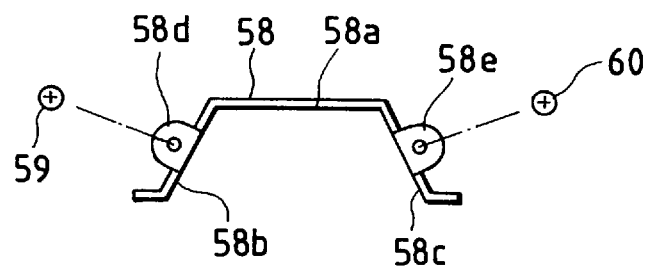
Figure 11C:
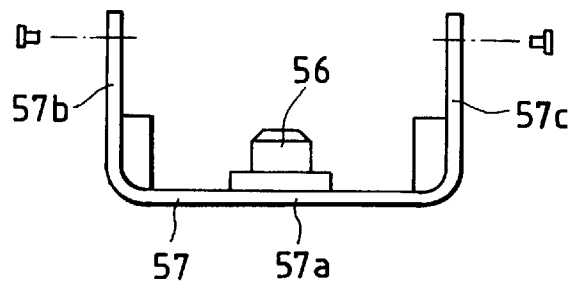

FIGS. 11A to 11C are developed views for showing the structure of the bottom portion of the body 51. As shown in FIG. 11A, the upper portion of the body 51 is comprised of a front body 51e and a rear body 51f. A mounting portion 51g is provided in a lower part of the front body 51e, and another mounting portion 51h is in a lower part of the rear body 51f. Screw holes 51i and 51j are provided in the mounting portions 51g and 51h. A bottom cover 57 has, as shown in FIG. 11C, a U-shaped cross section which is opened upward, and is comprised of a bottom portion 57a, a front portion 57b and a rear portion 57c. A partition member 58 has, as shown in FIG. 11B, a U-shaped cross section which is opened downward, and is comprised of a top portion 58a, a front portion 58b and a rear portion 58c. A mounting portion 58d is provided in the end portion of the front portion 58b, and another mounting portion 58e is in the end portion of the rear portion 58c. The mounting portions 58d and 58e are threadably attached to the mounting portions 51g and 51h of the body 51 by the screws 59 and 60 and the screw holes 51i and 51j so as to fix the partition member 58 to the body 51.

Figure 12:
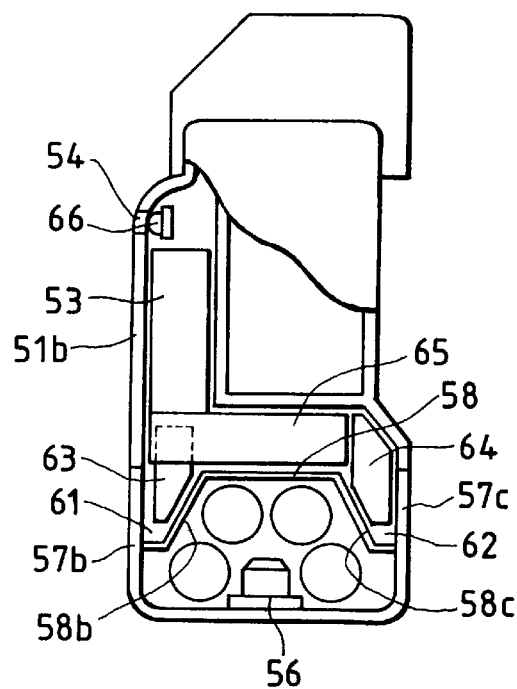
FIG. 12 is a partially sectional side view of the electric camera taken along a line XII—XII in FIG. 8.

FIG. 12 is a partially sectional side view taken along a line XII—XII in FIG. 8. In FIG. 12, a space 61 surrounded by the front portion 57b of the bottom cover 57 and the front portion 58b of the partition member 58 is formed at a position in front (on the object side) of the power source 52. Another space 62 which is surrounded by the rear portion 57c of the bottom cover 57 and the rear portion 58c of the partition member 58 is formed at a position in the rear (on the film side) of the power source 52. An electric circuit 63 is contained in the space 61, while another electric circuit 64 is contained in the space 62. It is noted that the electric circuits 63 and 64 are contained in such a manner that the side provided with the electric components faces the tripod mounting screw 56.

A rewinding drive mechanism 65 is contained above the partition member 58. The rewinding drive mechanism 65 is driven by the motor 53. A display member 66 for a self timer is contained above the motor 53. Light-emitting display of the display member 66 is shown externally through a window member (light-emitting display portion 54). Note that a remote control receiving device or a connector for connecting the camera body to an external device may be contained above the motor 53, instead of the display member 66 for a self timer.

Figure 13:
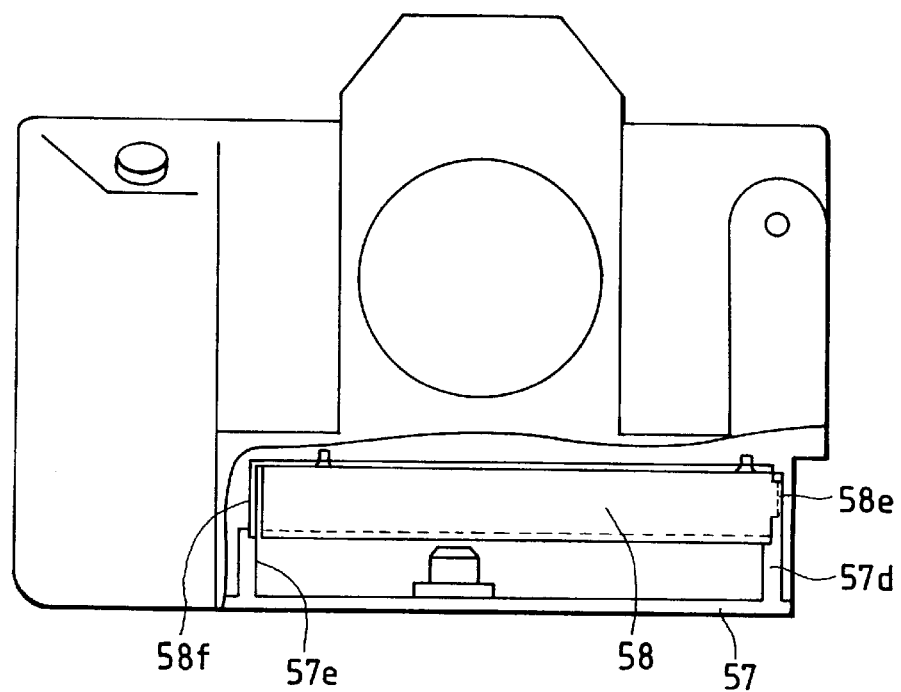
FIG. 13 is a partially sectional front view for showing the electric camera according to the second embodiment of the present invention.

FIG. 13 is a partially sectional view for showing a state of containment of the power source 52. An end portion 58f of the partition member 58 in a lower part in FIG. 13 is engaged with a wall portion 57e of the bottom cover 57 so as to form a space for containing the power source 52.

Figure 14:
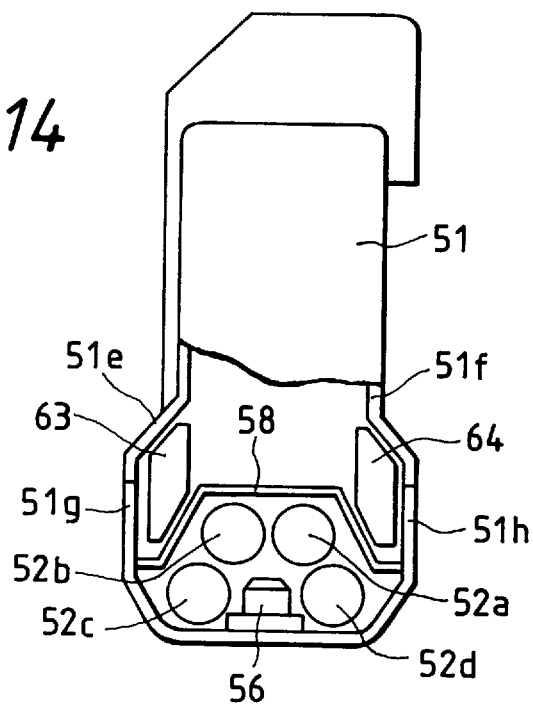
FIG. 14 is a partially sectional view for showing an electric camera according to a third embodiment of the present invention.

FIG. 14 is a partially sectional side view for showing an electric camera according to a third embodiment of the present invention. In the third embodiment, the front body 51e and a mounting portion 51g have different forms from those in the second embodiment. However, the same reference numerals as those in the second embodiment are used in the third embodiment in order to clearly indicate the corresponding relations.

More particularly, the front body 51e and the mounting portion 51g have projecting forms toward front surface (on the object side, left side in FIG. 14). An electric circuit 63 which is larger than that in the second embodiment is contained in this projecting space.

Figure 15:
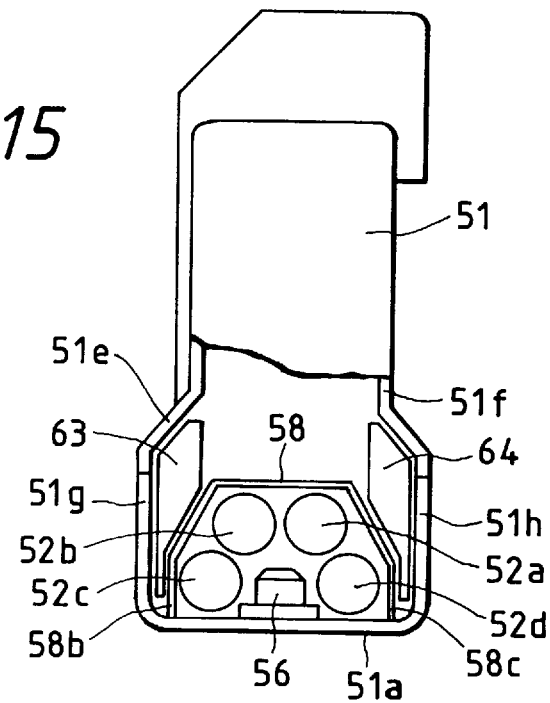
FIG. 15 is a partially sectional side view for showing an electric camera according to a fourth embodiment of the present invention.

FIG. 15 is a partially sectional side view for showing an electric camera according to a fourth embodiment of the present invention. In the fourth embodiment, the front body 51e, the rear body 51f and the mounting portions 51g and 51h have different forms from those in the second embodiment. The forms of the front portion 58b and the rear portion 58c of the partition member 58 are also different. However, the same reference numerals as those in the second embodiment are used in the fourth embodiment in order to clearly indicate the corresponding relations.

More particularly, the front body 51e and the mounting portion 51g are projecting to the front surface (on the object side, left side in FIG. 15), while the rear body 51f and the mounting portion 51h are projecting to the back surface (on the film side, right side in FIG. 15). Electric circuits 63 and 64 which are larger than those in the second embodiment are respectively contained in these projecting spaces. Further, the partition member 58 is in a form that the front portion 58b and the rear portion 58c of the partition member 58 are hanging down to the bottom portion 51a of the body 51. A part of the electric circuit 63 (a lower part) is contained in a space which is formed between the mounting portion 51g of the body 51 and the front portion 58b of the partition member 58 because of this hanging form. Also, a part of the electric circuit 64 (a lower part) is contained in a space which is formed between the mounting portion 51h of the body 51 and the rear portion 58c of the partition member 58. As a result, larger electric circuits 63 and 64 than those in the third embodiment can be contained.

According to the embodiments described above, a cross-sectional form of the partition member is made to be aligned with the cross-sectional form of the power source which is disposed in the shape of an unfolded fan so as to avoid the tripod mounting screw, thereby forming spaces in front and in rear of the bottom cover. Therefore, it is possible to effectively utilize the spaces while maintaining the external size of the camera to be substantially a minimum. A small space at the end portion of the motor containing portion which projects to the front surface is also effectively utilized. Not only a self timer display device, but also a device for receiving an optical remote control signal from an external unit or a connector such as a synchro-terminal may be contained in this small space.

As described, according to the electric camera of the present invention, the plurality of bar-like cells in the lowest stage are disposed so as to interpose the tripod mounting screw between them, the plurality of bar-like cells in the stages above the lowest stage are disposed so as to be adjacent to each other without interposing the tripod mounting screw between them, spaces are formed above a projected portion formed to allow the bar-like cells in the lowest stage to interpose the tripod mounting screw and in the side portions of the bar-like cells disposed so as to be adjacent to each other without interposing the tripod mounting screw between them, and the wiring boards are disposed in these spaces. As a result, the cells, the electric circuits, and the tripod mounting screw can be efficiently contained so as to miniaturize the camera.

What is claimed is:

1. An electric camera comprising:

a camera body;

a display portion to display information preset to said camera body;

a tripod mounting screw portion provided in a bottom portion of said camera body; and a cell containing portion having first and second stages, said first stage comprises a first plurality of cells so as to interpose said tripod mounting screw portion between said first plurality of cells, and said second stage comprises a second plurality of cells without interposing said tripod mounting screw portion between said second plurality of cells;

wherein said second stage is disposed on top of said first stage, one side portion of said first stage is extended outwardly beyond one side portion of said second stage to be a projected portion, and said display portion is disposed in a space which is defined in a direction of height of said camera body by a plane defining an upper surface of said first stage and a plane defining an upper surface of said second stage and defined in an optical axis direction of said camera by a side surface of said projected portion and a side surface of said second stage.

2. An electric camera according to claim 1, wherein said first stage has said projected portion extended only toward a rear portion of said camera body and a side portion of said second stage opposite to said one side portion of said second stage is aligned with a side portion of said first stage opposite to said one side portion of said first stage on a front side of said camera body.

3. An electric camera according to claim 1, wherein said cell containing portion is formed so that a cell case having a plurality of stages corresponding to said first and second stages comprising said first and second plurality of cells is removably inserted into said cell containing portion.

4. An electric camera comprising:

a camera body;

an operation portion to set a condition of said camera body;

a tripod mounting screw portion provided in a bottom portion of said camera body; and a cell containing portion having first and second stages, said first stage comprises a first plurality of cells so as to interpose said tripod mounting screw portion between said first plurality of cells, and said second stage comprises a second plurality of cells without interposing said tripod mounting screw portion between said second plurality of cells;

wherein said second stage is disposed on top of said first stage, one side portion of said first stage is extended outwardly beyond one side portion of said second stage to be a projected portion, and said operating portion is disposed in a space which is defined in a direction of height of said camera body by a plane defining an upper surface of said first stage and a plane defining an upper surface of said second stage and defined in an optical axis direction of said camera by a side surface of said projected portion and a side surface of said second stage.

5. An electric camera according to claim 4, wherein said first stage has said projected portion extended only toward a rear portion of said camera body and a side portion of said second stage opposite to said one side portion of said second stage is aligned with a side portion of said first stage opposite to said one side portion of said first stage on a front side of said camera body.

6. An electric camera according to claim 4, wherein said cell containing portion is formed so that a cell case having a plurality of stages corresponding to said first and second stages comprising said first and second plurality of cells is removably inserted into said cell containing portion.

7. An electric camera body comprising:

a tripod mounting screw portion located at a bottom portion of said camera body; and a cell containing portion comprising first and second stages with the first stage located underneath the second stage, wherein said first stage comprises a first plurality of cells interposed by said tripod mounting screw portion, said second stage comprises a second plurality of cells located at a distance from said tripod mounting screw portion, and a projected portion of said first stage extends outwardly beyond a side portion of said second stage; and a display portion disposed in a space which is defined in a direction of height of said electric camera body by a plane defining an upper surface of said first stage and a plane defining an upper surface of said second stage and defined in an optical axis direction of said camera body by a side surface of said projected portion and a side surface of said second stage, for displaying operation information preset to said camera body.

8. The electric camera body according to claim 7, wherein said projected portion is extended toward a back portion of said camera body; and wherein a front portion of said second stage and a front portion of said first stage are in alignment and are located at a front portion of said camera body.

9. The electric camera body according to claim 7, wherein said first stage and said second stage are removably inserted into said cell containing portion.

10. An electric camera body comprising:

a tripod mounting screw portion located at a bottom portion of said camera body; and a cell containing portion comprising first and second stages with the first stage located underneath the second stage, wherein said first stage comprises a first plurality of cells interposed by said tripod mounting screw portion, said second stage comprises a second plurality of cells located at a distance from said tripod mounting screw portion, and a projected portion of said first stage extends outwardly beyond a side portion of said second stage; and an operation control portion disposed in a space which is defined in a direction of height of said camera body by a plane defining an upper surface of said first stage and a plane defining an upper surface of said second stage and defined in an optical axis direction of said camera body by a side surface of said projected portion and a side surface of said second stage, for setting an operation condition of said camera body.

11. The electric camera body according to claim 10, wherein said projected portion is extended toward a back portion of said camera body; and wherein a front portion of said second stage and a front portion of said first stage are in alignment and are located at a front side of said camera body.

12. The electric camera body according to claim 10, wherein said first stage and said second stage are removably inserted into said cell containing portion.

13. An electric camera comprising:

a camera body;

a display portion to display information; and a cell containing portion including first and second stages;

wherein said second stage is disposed on top of said first stage, one side portion of said first stage is extended outwardly beyond one side portion of said second stage to be a projected portion, and said display portion is disposed in a space which is defined in a direction of height of said camera body by a plane defining an upper surface of said first stage and a plane defining an upper surface of said second stage and defined in an optical axis direction of said camera by a side surface of said projected portion and a side surface of said second stage.

14. An electric camera comprising:

a camera body;

an operation portion to set a condition of said camera body; and a cell containing portion including first and second stages;

wherein said second stage is disposed on top of said first stage, one side portion of said first stage is extended outwardly beyond one side portion of said second stage to be a projected portion, and said operation portion is disposed in a space which is defined in a direction of height of said camera body by a plane defining an upper surface of said first stage and a plane defining an upper surface of said second stage and defined in an optical axis direction of said camera body by a side surface of said projected portion and a side surface of said second stage.

* * * * *